United States Patent
Godoroja et al.

(10) Patent No.: US 6,173,157 B1
(45) Date of Patent: Jan. 9, 2001

(54) METHOD OF REGISTERING AND CONTROLLING REGISTRATION DATA FOR NEW AND ROAMING PAGERS IN A PAGING SYSTEM

(75) Inventors: Andrei Godoroja, North Vancouver; Glenn S. Fawcett, Vancouver, both of (CA)

(73) Assignee: Glenayre Electronics, Inc., Charlotte, NC (US)

( * ) Notice: Under 35 U.S.C. 154(b), the term of this patent shall be extended for 0 days.

(21) Appl. No.: 08/893,528

(22) Filed: Jul. 11, 1997

Related U.S. Application Data

(60) Provisional application No. 60/022,045, filed on Jul. 22, 1996, and provisional application No. 60/021,617, filed on Jul. 12, 1996.

(51) Int. Cl.$^7$ ....................................................... H04B 7/00
(52) U.S. Cl. ............................. 455/31.2; 455/432; 455/433; 340/825.44
(58) Field of Search ................................. 455/31.2, 31.3, 455/432, 433, 435, 456, 458, 461; 340/825.44; 380/23, 247, 248, 271

(56) References Cited

U.S. PATENT DOCUMENTS

| | | | |
|---|---|---|---|
| 5,153,902 | * | 10/1992 | Buhl et al. ............................. 455/432 |
| 5,175,758 | * | 12/1992 | Levanto et al. ....................... 455/458 |
| 5,276,680 | | 1/1994 | Messenger . |
| 5,353,331 | | 10/1994 | Emery et al. . |
| 5,357,561 | * | 10/1994 | Grube .................................... 455/456 |
| 5,416,827 | | 5/1995 | Gaskill . |
| 5,432,841 | * | 7/1995 | Rimer ................................... 455/432 |
| 5,440,613 | | 8/1995 | Fuentes . |
| 5,463,672 | * | 10/1995 | Kage ..................................... 455/458 |
| 5,469,496 | | 11/1995 | Emery et al. . |
| 5,475,735 | | 12/1995 | Williams et al. . |
| 5,485,163 | * | 1/1996 | Singer et al. ........................ 455/31.2 |
| 5,506,887 | | 4/1996 | Emery et al. . |
| 5,561,840 | * | 10/1996 | Alvesalo et al. ..................... 455/433 |
| 5,579,379 | | 11/1996 | D'Amico et al. . |
| 5,594,945 | * | 1/1997 | Lewis et al. .......................... 455/433 |
| 5,649,289 | * | 7/1997 | Wang et al. .......................... 455/458 |

* cited by examiner

*Primary Examiner*—Nay Maung
(74) *Attorney, Agent, or Firm*—Christensen O'Connor Johnson Kindness PLLC

(57) ABSTRACT

A method for registering and controlling registration data for new and roaming pagers in a paging system. Messages for the pagers pass through an input messaging switch to the pager's home messaging switch, from which the messages are sent to an output messaging switch to be transmitted to the pagers. When a pager roams into and area, it sends out a registration message that is received by an output messaging switch. The output messaging switch then contacts the home messaging switch for the pager. The pagers are programmed with a home identifier, which they transmit as part of their registration message. The home identifier can be converted to the address of the pager's home node in home messaging switch. In this way, an output messaging switch knows which home messaging switch to contact when it receives a registration message from the pager. The home identifier in a pager can be reprogrammed through an over-the-air procedure. The home identifier in a pager can be reprogrammed through an over-the-air procedure. The home messaging switches an output messaging switches are able to send messages to one another in order to update and synchronize registration data. When a messaging switch is searching for a pager or a pager record, it can send a request message to multiple other messaging switches and will receive a response from only the messaging switch that has the required data. A special home node may be designated for the registration of new pagers.

21 Claims, 10 Drawing Sheets

METHOD OF REGISTERING AND CONTROLLING REGISTRATION DATA FOR NEW AND ROAMING PAGERS IN A PAGING SYSTEM

RELATED APPLICATIONS

The benefit of the filing date of provisional application Ser. No. 60/022,045, filed on Jul. 22, 1996, and provisional application Ser. No. 60/021,617, filed on Jul. 12, 1996, is hereby claimed for this application under 35 U.S.C. § 119(e).

FIELD OF THE INVENTION

The present invention relates to paging systems in general, and in particular to a method of registering and controlling registration data for new and roaming pagers in a paging system.

BACKGROUND OF THE INVENTION

Paging systems have undergone significant changes in the past twenty years. Early paging units were simple radio receivers that beeped upon receipt of a paging signal from a paging service. These paging units could not respond to the paging service because they were only simple receivers. Thus, the system had no way to keep track of the location of each pager and had to transmit every outgoing pager message from every transmitter in the areas where the pager was to receive coverage.

With the development of two-way pagers, which contain their own small, low-power transmitters, pagers became capable of sending signals to the paging system. Thus, by including geographically spaced-apart receivers in the paging system, the general location of a pager could be determined by measuring the strength of its signal relative to each receiver. With this advancement, simple methods for registering the locations of pagers were developed. Under one method, each pager is made to broadcast its unique serial number when it is turned on or at some other prompting. Once a paging system's receiver receives a pager's signal, it contacts a central database to record the current location of the pager. Future messages for the pager are then sent to the nearest transmitter station for broadcast. The central database also contains a service record for the pager that includes the pager's serial number as well as information manually entered by the service providers when a new pager is purchased and service is activated. The service record indicates the areas of coverage and types of service for the pager.

As the areas of use and numbers of users have expanded, a need has developed for more efficient registration methods. Having to access a central database every time a message needs to be sent, in addition to actually sending the message, utilizes excess amounts of time and paging system resources. Also, prior systems have had few, if any, effective methods for finding a lost pager or correcting similar registration errors that may be stored at various locations in a paging system.

The present invention is directed to providing a method to overcome the foregoing and other disadvantages. More specifically, the present invention is directed to an efficient method for registering new pagers and for keeping track of pagers once they are in a paging system.

SUMMARY OF THE INVENTION

A paging system including messaging switches that are used to transfer messages to pagers is provided. Different types of messaging switches may be used, including an input messaging switch for receiving messages from an input such as a telephone line or a computer, a home messaging switch for storing messages for the pagers and recording the current geographical location of the pagers to which the messages should be sent, and an output messaging switch for transferring the messages to the broadcast stations near where the pagers are located.

According to the present invention, when a pager roams into a geographic area covered by the base station transmitters of an output messaging switch, the pager registers with the output messaging switch by sending out a registration signal that can be converted into information as to the pager's home node. Once the output messaging switch receives the registration signal from the pager, it sends a Register Location message to the home messaging switch that contains the home node for the pager. Once the home messaging switch receives the Register Location message from the output messaging switch, it sends future messages for the pager to that output messaging switch.

In accordance with another aspect of the invention, when a pager registers, the output messaging switch determines the appropriate home node for the pager by converting a home identifier that the pager sends with its registration message. The pager may send the entire home identifier, or only a part thereof. The conversion may be done through means such as an algorithm or a look-up table. The pager may be programmed with the home identifier through an over-the-air procedure that originates at the home messaging switch and is then transmitted to the pager from the output messaging switch. The home identifier programming information is broadcast to the pager through a series of two-way pager protocol operations. The home identifier can also be changed at a later time through similar over-the-air procedures. Having the home identifier stored in the pager can eliminate the need for the output messaging switch to contact a central database to determine the correct home node for the pager when a registration message is received.

In accordance with another aspect of the invention, a home node in a home messaging switch may be specially designated for the registration of new pagers. Pagers can be programmed when they are manufactured with the home identifier that converts to the address for the special new pager home node. Then, when a new pager registers for the first time, the output messaging switch sends the Register Location message to the new pager home node. The new pager home node then sends a message to reprogram the home identifier in the pager to correspond to a regular home node, which will service the pager from that time on. By using this process, a pager can be programmed at the factory with the home identifier for the new pager home node and, then, at a later time the regular home node for the pager can be selected and programmed into the pager.

In accordance with another aspect of the invention, the home messaging switch for the pager is able to search for the current location of the pager by sending a Find Output Node With Pager message to groups or all of the output nodes in the system. The output messaging switch that has the output node that has the pager registered with it will respond to the home messaging switch, thus revealing the pager's current output node location. In addition to being able to search for the pager at the output node level, the home messaging switch is able to search for the pager all the way down to the pager level by sending an Initiate Location Query message to all of the output messaging switches. Upon receiving an Initiate Location Query message, the output messaging switches broadcast a specific Locate signal that will only be responded to by the correct pager. The output messaging switch that receives the response from the pager will then respond to the home messaging switch, thus revealing the pager's current location. Searching for the pager at various levels is significantly more efficient than searching only at the pager level. Searching at the pager level requires the use of substantial valuable air time and over-the-air resources. By conducting initial searches only at the output node level, considerable resources are saved.

In accordance with another aspect of the invention, an output messaging switch is able to determine the correct home node for the pager by sending a Find Home Node With Pager message to groups or all of the home nodes in the system. The home messaging switch that has the home node that has the record for the pager will respond to the output messaging switch, thus revealing the correct home node for the pager. By being able to search for the correct home node for the pager, the output messaging switch is able to proceed in instances where the pager has been programmed with an incorrect home identifier.

In accordance with another aspect of the invention, when an output messaging switch loses touch with a pager, it continues to try to reach the pager with a periodic Find Pager message. When the pager finally does respond and/or reregister in response to the Find Pager messages, the output messaging switch sends a Pager Recovered message to the home messaging switch. The home messaging switch then responds to the output messaging switch verifying that it is the correct home messaging switch for the pager and relaying the current pager information. Continuing to search for a pager that is temporarily unavailable or not responding ensures that when the pager is recovered, it will be reentered in the system as quickly as possible.

In accordance with another aspect of the invention, the output messaging switch is able to confirm that the information in its registration database is synchronized with the information in a home messaging switch's registration database. To confirm the synchronization, the output messaging switch sends a Confirm Registration message to the home messaging switch. The home messaging switch replies with a Confirm Registration Reply to the output messaging switch. The Confirm Registration Reply includes the relevant registration information from the home messaging switch's registration database. The output messaging switch uses this information to confirm that the data in its registration database is the same as the data in the home messaging switch's registration database. If the information is not the same, the output messaging switch may contact the pager to confirm the data and, if necessary, will send a data correction message to the home messaging switch.

In accordance with another aspect of the invention, a home messaging switch is able to update registration data in an output messaging switch. To update data, the home messaging switch sends a Change Pager Registration message to the output messaging switch. The Change Pager Registration message includes changes such as updating the pager's service coverage area, or removing a pager registration from an output node when the pager has moved on to a new output node area.

In accordance with another aspect of the invention, a pager may transmit either the entire home identifier or just a part thereof to an output messaging switch when the pager registers. To then determine the proper home node for the pager, the pager may be polled, or else the select home nodes that match the partial address converted from the partial home identifier may be searched. One method to search the select home nodes is to send each one a Register Location message and see if it responds with a reply indicating it has the pager record.

It will be appreciated that the disclosed methods are advantageous in that they provide a highly efficient means for registering and keeping track of new and roaming pagers in a paging system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
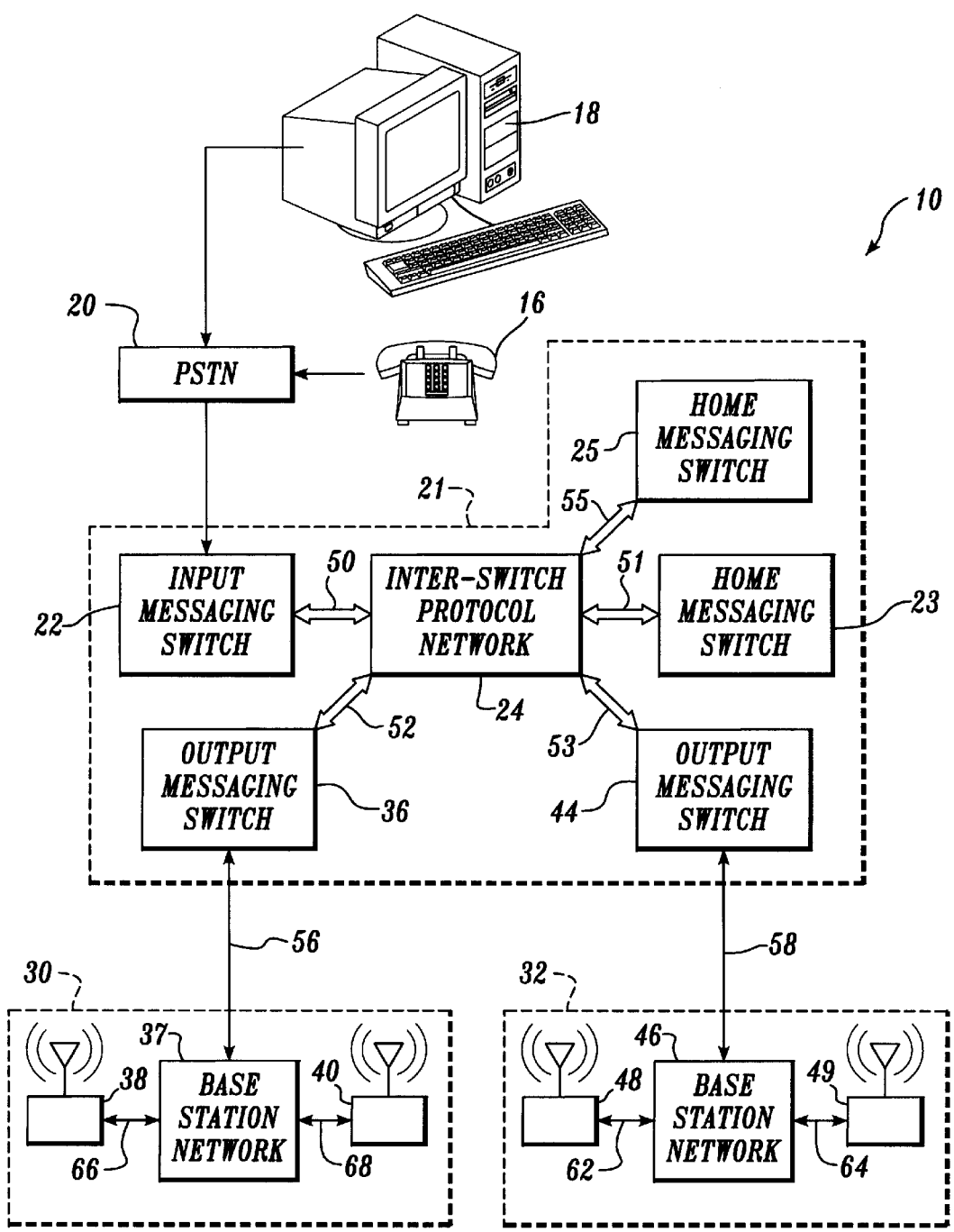
FIG. 1 is a block diagram of a paging system.

The major components of a paging system 10 are illustrated in FIG. 1. A common type of information that passes through paging systems are message packets that are entered by a user to be broadcast to a particular paging unit. Message packets of this type are entered into the paging system 10 via a public switched telephone network 20 from either a standard telephone 16 or a computer 18. The message packets are then transferred to an input messaging switch 22 that is an input component to a messaging switch system 21. Message packets are then passed via a communication link 50 through an interswitch protocol network 24 to home messaging switch 23 or 25, via communication link 51 or 55, respectively. The home messaging switch 23 or 25 contains information specific to the paging unit for which the message packet is destined. Communication links 50, 51 and 55 may be either simple wires, microwave links, satellite links, or any other suitable communication path.

The message packet is then transferred via communication link 51 or 55 back through the interswitch protocol network 24 to output messaging switch 36 or 44, via communication link 52 or 53, respectively. As will be described in more detail below, the output messaging switch to which the message packet is transferred is determined by which output messaging switch the destined paging unit has registered with using the method of the present invention. Output messaging switches 36 and 44 are output components of the messaging switch system 21. Message packets from output messaging switch 36 or 44 are sent to transmitting system 30 or 32, respectively, via communication line 56 or 58. Message packets sent to transmitting system 30 are sent through base station network 37 and then selectively sent via communication link 66 or 68 to base station 38 or 40, respectively, to be broadcast to paging units within that geographical region. Message packets sent to transmitting system 32 are sent through a base station network 46 and then selectively sent via communication link 62 or 64 to base station 48 or 49, respectively, to be broadcast. In the preferred embodiment, base stations 38, 40, 48 and 49 are capable of both broadcasting and receiving signals to and from remote paging units, because both transmitters and receivers are located at the base stations. Alternatively, the receivers may be located at different locations from the base station transmitters.

The specific geographical area in which a particular paging unit is located may be determined by simultaneously broadcasting a unique Locate signal from the base stations 38 and 40 or 48 and 49. Once the paging unit that responds to the unique locate signal has received the signal, it sends back an Acknowledge signal to the base stations 38 and 40 or 48 and 49. One or both of the base stations 38 and 40 or 48 and 49 receive the acknowledge signal and send information as to the strength of the signal back to the output messaging switch 36 or 44 for analysis in determining which base station is closest to the paging unit. Then the message packet for that paging unit may be broadcast from the closest base station. It should be noted that, as described below in the preferred embodiment, this process of locating the closest base station to the pager is performed at a different level than the process of pagers registering with the closest output messaging switch. In other words, when a pager is registered at the broad output messaging switch location, it may be near any of the output messaging switch's base stations, but when the closest base station to the pager is determined, that provides more specific location information.

The protocols used by the messaging switch system 21 govern how messages are sent between the messaging switches 22, 23, 25, 36, and 44. While the messages being sent will often be referred to as "message packets," or simply "messages," in this application, they may actually be any type of application protocol data unit (APDU), which is a "packet" form in which data or commands may be sent between any of the messaging switches. The messaging switch system 21 includes the input messaging switch 22 as an input device, the home messaging switches 23 and 25 as information storage devices, the output messaging switches 36 and 44 as output devices, and the interswitch protocol network 24 that connects all of the messaging switches. In the preferred embodiment, input messaging switches and home messaging switches may be aspects of the same physical piece of equipment.

Figure 2:
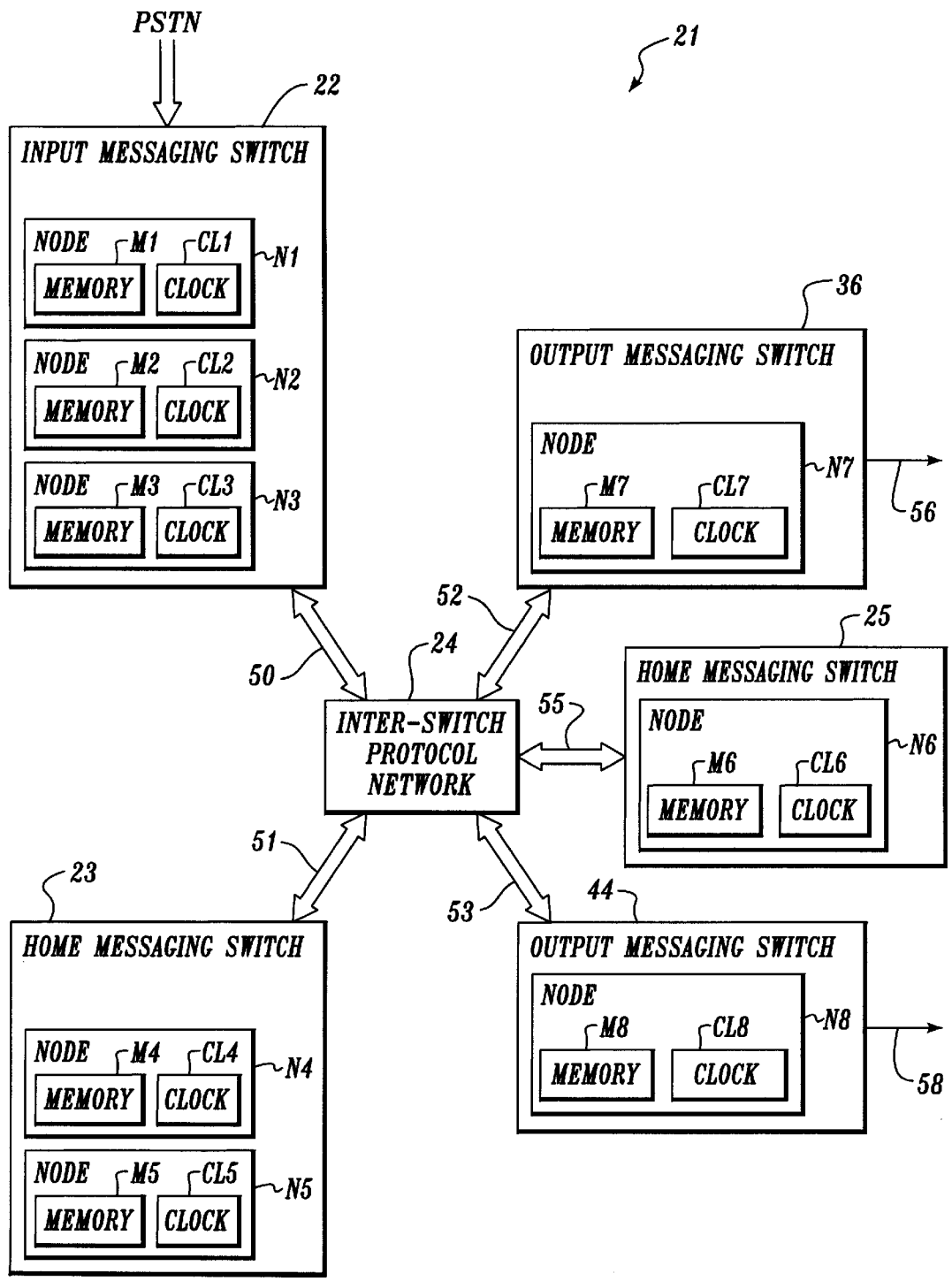
FIG. 2 is a block diagram of the messaging switch system of FIG. 1.

As shown in FIG. 2, key components in each messaging switch are assigned a "node" designation in the messaging switch system 21. A node may represent any number of components, i.e., in an input messaging switch, a node may represent a group of incoming telephone lines, in a home messaging switch a node may represent a memory storage area for a particular paging unit, and in an output messaging switch a node may represent transmitters in a particular geographic region. Thus, a single messaging switch may have many nodes within it. Each node is given a unique address identification number that the messaging switch system 21 then uses to identify the location of each key component in the network. Messages sent to a node address are processed by the messaging switch in which the node is located.

As shown in FIG. 2, input messaging switch 22 includes nodes N1, N2 and N3, home messaging switch 23 includes nodes N4 and N5, home messaging switch 25 includes node N6, output messaging switch 36 includes node N7, and output messaging switch 44 includes node N8. In actual practice, any messaging switch may include any number of nodes. Each node includes a memory area and a clock; thus, nodes N1 to N8 include memories M1 to M8 and clocks CL1 to CL8, respectively. While the use of the nodes is described below with reference to a message packet being sent from the PSTN 20 through the paging switch network to a particular paging unit, it should be understood that different types of message packets or APDUs may be sent through different paths and through any order of nodes. For example, in the preferred embodiment, different types of information requests are sent between the home messaging switches and the output messaging switches.

Nodes N1, N2 and N3 are included in input messaging switch 22 and may each represent a group of incoming telephone lines from the public switched telephone network 20. The input messaging switch 22 accepts messages from the public switched telephone network 20 and then sends the messages to the appropriate home messaging switch 23 that is assigned to the particular paging unit that is to be paged.

Message packets from the node N1, N2 or N3 of input messaging switch 22 are sent through interswitch protocol network 24 to node N4 or N5 in home messaging switch 23, or to node N6 in home messaging switch 25. Nodes N4, N5 and N6 are home nodes that may generally represent information storage areas required for each individual paging unit. All information sent to and from the paging unit passes through the paging unit's home node. The home node stores incoming message packets and subsequently sends the messages through output switches to the paging unit, as described below. The home node also keeps the database record regarding a paging unit, including information as to the present registered location of the paging unit, as will be described in more detail below.

Message packets from the node N4, N5 or N6 of home messaging switch 23 or 25 are sent through interswitch protocol network 24 to node N7 or N8 in output messaging switch 36 or 44, respectively. Nodes N7 and N8 may generally be associated with certain transmitters or geographical areas covered by the transmitters. Thus, nodes N7 and N8 may represent transmitters for a particular area of coverage, such as a particular city, and message packets to be broadcast in that city would be sent to that node.

With respect to the geographic areas covered by the output nodes, the present invention provides a method for paging units to register their current physical node location. As described in more detail below, when a pager arrives in a geographic area covered by the base stations associated with an output node, the pager "registers" with the output node. Different events may trigger a pager to send out a Registration signal; for example, pagers may send out Registration messages in response to detecting a new "zone" signal from nearby transmitters.

Once an output node receives a registration signal, it contacts the home node for the pager so that the home node will know to send the pager's messages to that output node. For example, with reference to FIG. 1, if a pager came into the geographical area covered by base station 38 or 40 and then sent out a Registration message, it would be registering with output node N7 (FIG. 2) in output messaging switch 36. If the home node for the pager was node N4 in home messaging switch 23, output messaging switch 36 would then send a Register Location message to home node N4. Home messaging switch 23 would then record the location of the pager as being at node N7, as identified by node N7's unique node address number which would be included as part of the Register Location message. The home messaging switch 36 would then send all messages for the pager to output node N7 in messaging switch 36 for as long as the pager remained registered with output node N7. When the output messaging switch 36 needed to broadcast a message to the pager, it would use the "locate" signal as described earlier to determine which particular base station 38 or 40 to use to broadcast the message.

Figure 3A:
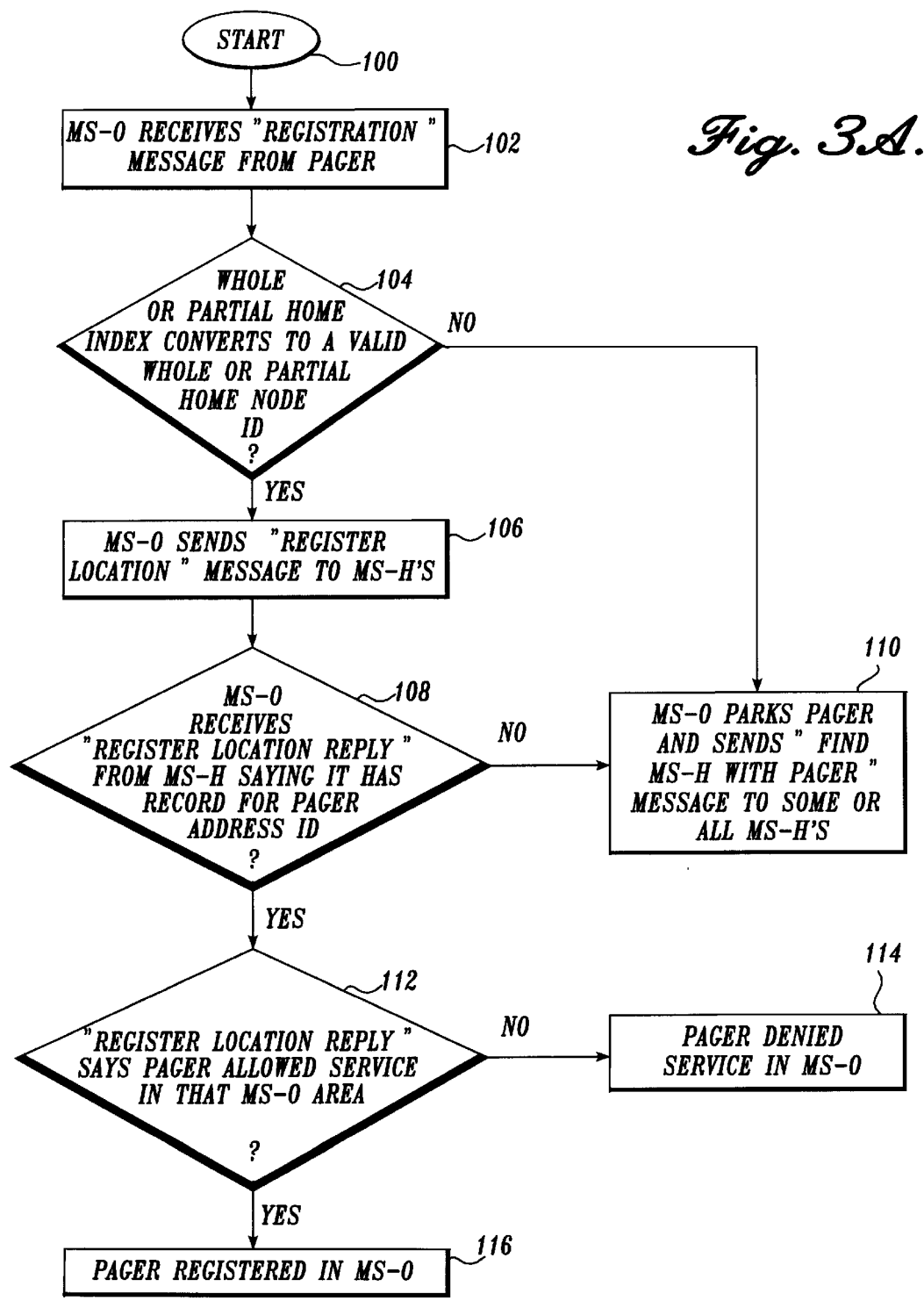
FIG. 3A is a flow chart of an output messaging switch's pager registration routine.
Figure 3B:
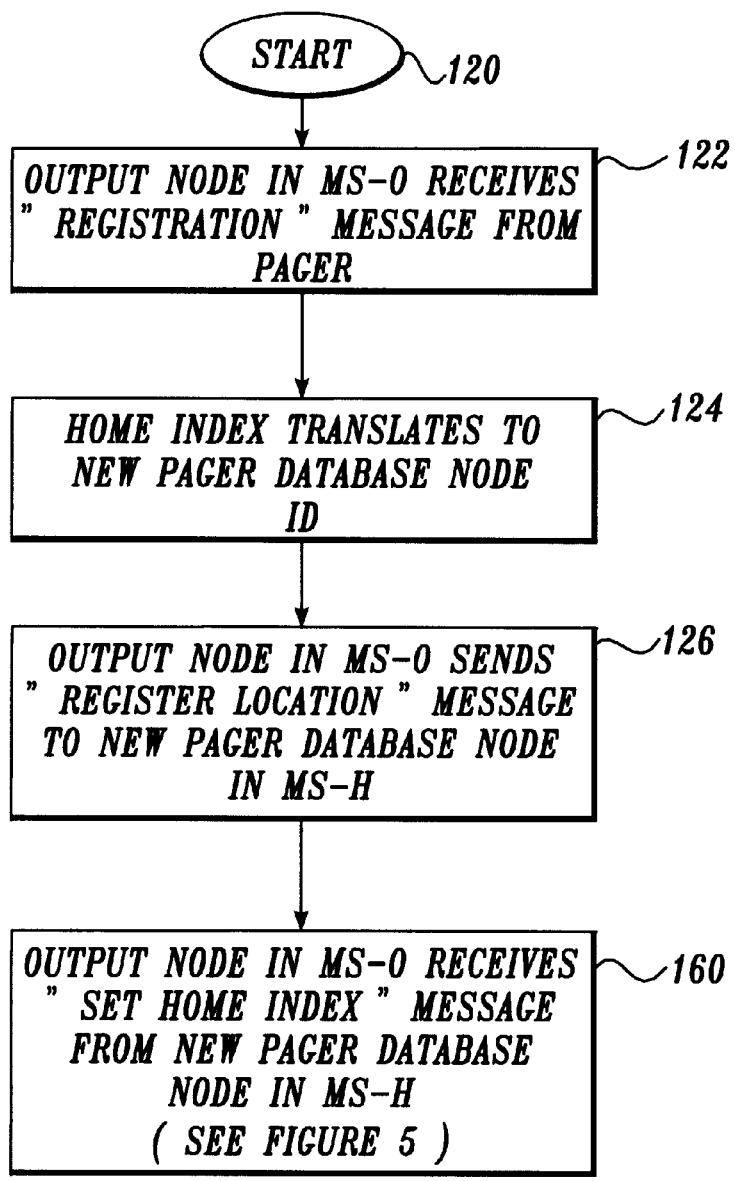
FIG. 3B is a flow chart of an output messaging switch's new pager registration routine in a system with a home node specifically reserved for new pagers.

Once a new Registration signal is received by an output node from a pager that is registering for the very first time, the output node must have a means for finding the correct home node for the pager so it knows which one to contact to tell where the pager currently is. One method for accomplishing this is to have a home node specifically designated for new pagers that cross-references all of the unique new pager IDs to the regular home nodes to which they will be assigned. Thus, when an output messaging switch receives a Registration signal from a new pager that includes the pager's ID and the address for the new pager home node, the output messaging switch can contact the new pager home node for further determination of the regular home node for the pager. However, an even more efficient method for determining a new pager's regular home node is to have the pager send a home identifier message that can be converted to the regular home node's unique address, along with its Registration message. FIG. 3A shows the general pager registration routine of an output messaging switch and FIG. 3B shows a specific example of the routine in a system with a home node that is specifically designated for new pagers.

The pager registration routine of FIG. 3A begins at a block 100. At a block 102 an output node (MS-O) in an output messaging switch receives a Registration message from the pager. Different events may trigger a pager to send out a Registration signal; for example, pagers may send out Registration messages in response to detecting a new "zone" signal from nearby transmitters.

At a decision block 104 the output messaging switch determines whether the home identifier that was part of the registration message from the pager converts to a valid home node address ID number. The conversion may be done through means such as an algorithm or a look-up table. The output messaging switch can determine whether a home node address ID number is valid because it has established an association with all of the home nodes, as is described in more detail in co-pending application Ser. No. 08/795,063, entitled Computer Network Using Association and ERA Data, filed on Feb. 5, 1997, which is hereby incorporated by reference. If the home identifier does convert to a valid home node address ID number, then the routine continues to a block 106. The pager may also send only a partial home identifier. In this case, the partial home identifier may only convert to one of several home node address ID numbers. One option is to then poll the pager for the rest of the home identifier. However, to save air time, another option is to determine each valid home node address ID that matches at least the partial address, and repeat block 106 for each such valid home node address ID. In the preferred case, there will only be one home node address ID that matches the partial address. If the whole or partial home identifier does not convert to a valid whole or partial home node address ID number, then the routine proceeds to a block 110. As will be described in more detail below, one reason why the home identifier may not convert into a valid home node address ID number is that the pager registering may be a new pager, which may be given a false home identifier at the factory that it will use the first time it is turned on as part of the process of new registration. The false home identifier may also be a code that specifically converts to indicate that a new pager is being registered.

At block 106 the output messaging switch sends a Register Location message to one or several home nodes (MS-H's) whose valid address ID numbers were converted from the registration message from the pager. After a short delay, at a block 108 the output messaging switch determines whether a Register Location Reply has been received from one of the home nodes indicating that the home node has a record for the pager. If a home node has a record for the pager, the routine proceeds to a block 112 and, if a home node does not have a record for the pager, the routine proceeds to block 110.

At block 110 the output messaging switch sends a response to the pager indicating that its request for registration has been received but that the pager will be temporarily parked. A parked pager does not initiate any commands and will not be sent any messaging packets from the output messaging switch or receive any other service. Also occurring at block 110 is that the output messaging switch sends a Find MS-H With Pager message to some or all of the home nodes. For example, if the home identifier at block 104 is converted to a partial address for some home nodes, and if those nodes had not already been searched by the process at block 106, only those home nodes might be searched in a first search for the pager record. If this search was not successful, a full search of all home nodes could be made. Upon receiving the Find MS-H With Pager message, the home messaging switches will check the pager ID number against a list of pagers for which that home messaging switch has home nodes and respond positively to the output messaging switch if there is a match. If there is a match, the home messaging switch will send a Set Home Identifier message to the output messaging switch, as is described in more detail below with reference to FIG. 5.

At block 112, the output messaging switch determines whether the Register Location Reply that was received from the home node says that the pager should be allowed service in the output node area. If the pager is denied service, the routine continues to a block 114, where the pager is sent an acknowledgment and the output messaging switch marks the pager in the output messaging switch's database as being denied service, which like parking prevents the pager from initiating any commands. If the pager is allowed service, the routine continues to a block 116 where the pager is sent an acknowledgment and the output messaging switch marks the pager in the output messaging switch's database as being allowed service, which indicates that the pager's registration process has been successfully completed and that the pager's home node now has it as being registered at the output node location.

The pager registration routine of FIG. 3B shows the new pager registration routine in a system with a home node that is specifically reserved for new pagers. This routine is basically a subset of the routine of FIG. 3A. The new pager registration routine begins at a block 120. At a block 122, the output messaging switch determines that the home identifier that was part of the registration message from the pager converts into the address for the home node that is reserved for the initial registration of new pagers. As described earlier, the new pager home node contains records for new pagers that have been designated to receive service but have not yet registered for the first time.

At block 126, the output messaging switch sends a Register Location message to the new pager home node, whose valid address ID number was indicated in the registration message from the pager. What happens next is determined by the service provider which may require different sequences when a new pager is registering. In some systems, after a short delay, at a block 160 the output messaging switch receives a Set Home Identifier message from the new pager home node in the home messaging switch. The routine then continues as is described below with reference to FIG. 5. In this case, the new pager home node will be setting the home identifier of the pager to correspond to a regular home node that has been programmed with the pager record and that will service the pager from that point on.

It will be appreciated that new pagers coming from the factory may be programmed with either a valid or invalid home identifier, depending upon the type of system in which they are intended to be used. A pager that is intended to be used in a system with a home node specifically designated for new pagers will be programmed with a home identifier that corresponds to the new pager home node. After the pager is programmed with the home identifier but before it is released into the marketplace, a record for the new pager, including a regular home node designation, can be entered into the registration database for the new pager home node. Then, once the pager is purchased and turned on for the very first time, a Register Location message would be received by the new pager home node, which could then send messages to reprogram the home identifier in the pager to correspond to the regular home node, which would provide service to the pager from that point on.

In contrast, when the pager is intended to be used in a system where there is no special new pager home node, the pager may be intentionally programmed at the factory with an invalid home identifier. An invalid home identifier may be programmed when the pager is manufactured if the eventual home node is at that time unknown. The regular home node may be unknown because the home node for a pager is sometimes selected based on proximity to a user's normal area of coverage and other factors. Thus, the service provider may wish to wait until a user has purchased and activated service for a pager before selecting a home node for the pager. This is in contrast to the special new pager home node system where at the time of manufacturing the home identifier only needs to correspond to the special new pager home node, which can be known well ahead of time. In the system without a new pager home node, when the pager attempts to register for the very first time, the routine of FIG. 3A at block 110 will proceed as described above.

Figure 4:
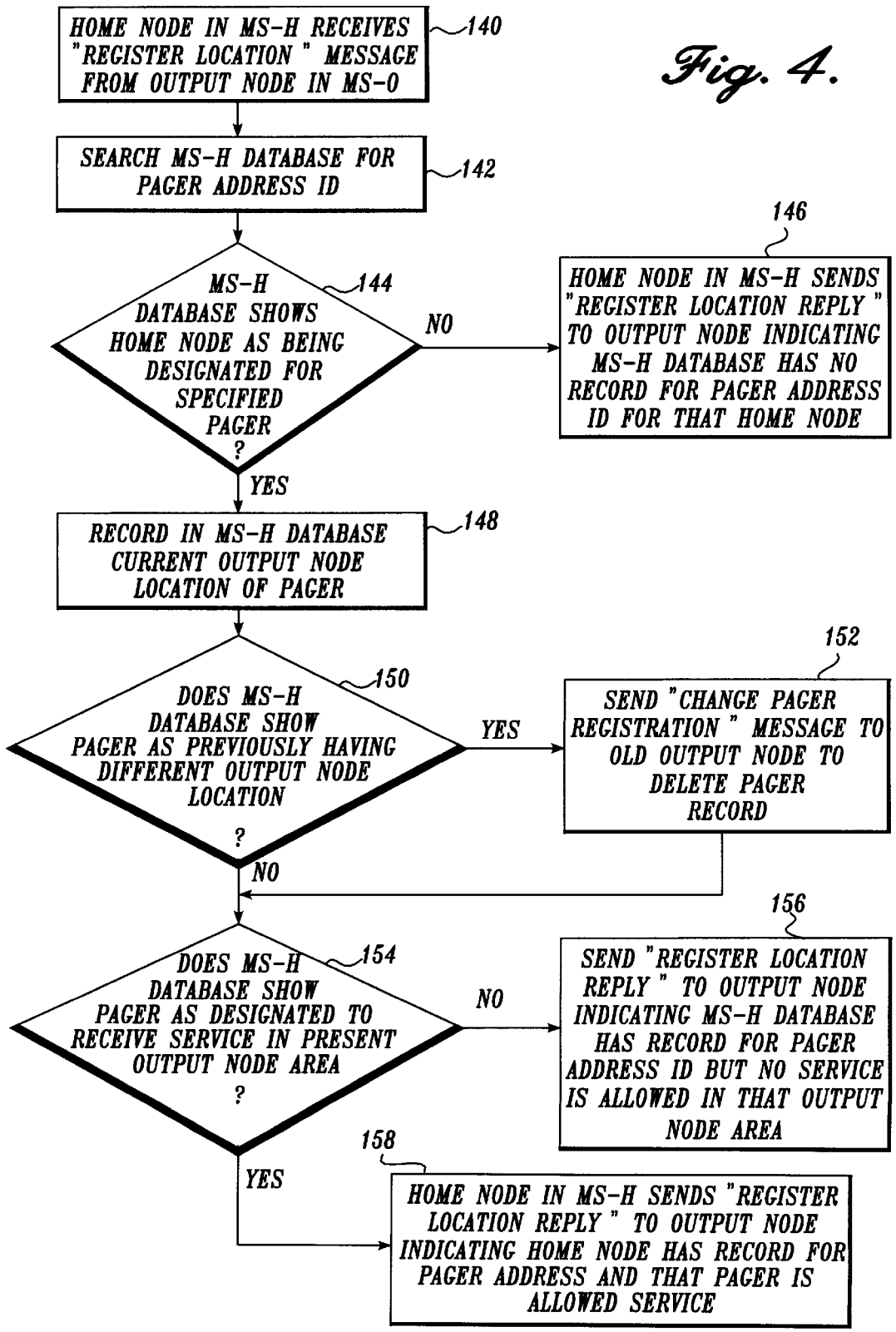
FIG. 4 is a flow chart of a home messaging switch's routine for replying to a Register Location message from an output messaging switch.

FIG. 4 shows the Register Location Reply routine of a home messaging switch. At a block 140, a home node in the home messaging switch receives a Register Location message from an output node in an output messaging switch. This is the message that would be sent from an output messaging switch at block 106 in FIG. 3A as part of the pager registration routine. At a block 142, the home messaging switch searches its registration database for the pager address ID to see if it has a record for the pager.

At a decision block 144, the home messaging switch determines whether its registration database has an entry showing a record for the pager for the specified home node. As described earlier, both the pager and the home node are identified by unique identification numbers within the paging system. If the home messaging switch cannot find a database entry for the pager or if the entry for the pager does not correspond to the correct home node, then the routine proceeds to a block 146. At block 146, the home messaging switch sends a Register Location Reply to the output node indicating that the home messaging switch database has no record for that pager for the home node to which the Register Location message was sent. The output messaging switch's response to the Register Location Reply can be seen in FIG. 3A, starting at decision block 108.

Returning to decision block 144, if the home messaging switch database does have the record for the pager, then the routine proceeds to a block 148. At block 148, the home messaging switch records in its database the current output node location of the pager. As was described earlier, the output node location of the pager can be determined from the unique identification number of the output node, which is included as part of the Register Location Message. At a decision block 150, the home messaging switch determines whether its database had previously shown a different output node location for the pager. If a different output node location was previously shown, the routine proceeds to a block 152, where the home messaging switch sends a Change Pager Registration message to the old output node so as to delete the pager record from the old output node. It will be appreciated that the Change Pager Registration message shown in block 152 can also be used to change a pager record in an output node for other purposes, such as enabling or disabling service. After the old output node record is deleted, the routine proceeds to a decision block 154.

At decision block 154, the home messaging switch determines whether its record for the pager shows the pager as being designated to receive service in the present output node area. If no service should be received, the routine proceeds to a block 156 where the home messaging switch sends the Register Location Reply to the output node indicating that the registration message was received by the correct home node but that the pager should not receive any service in the current output node area. If service is allowed in the output node area, then the routine proceeds to a block 158 where the home messaging switch sends the Register Location Reply to the output node indicating that the registration message was received by the correct home node and that the pager is allowed service in that area.

Figure 5:
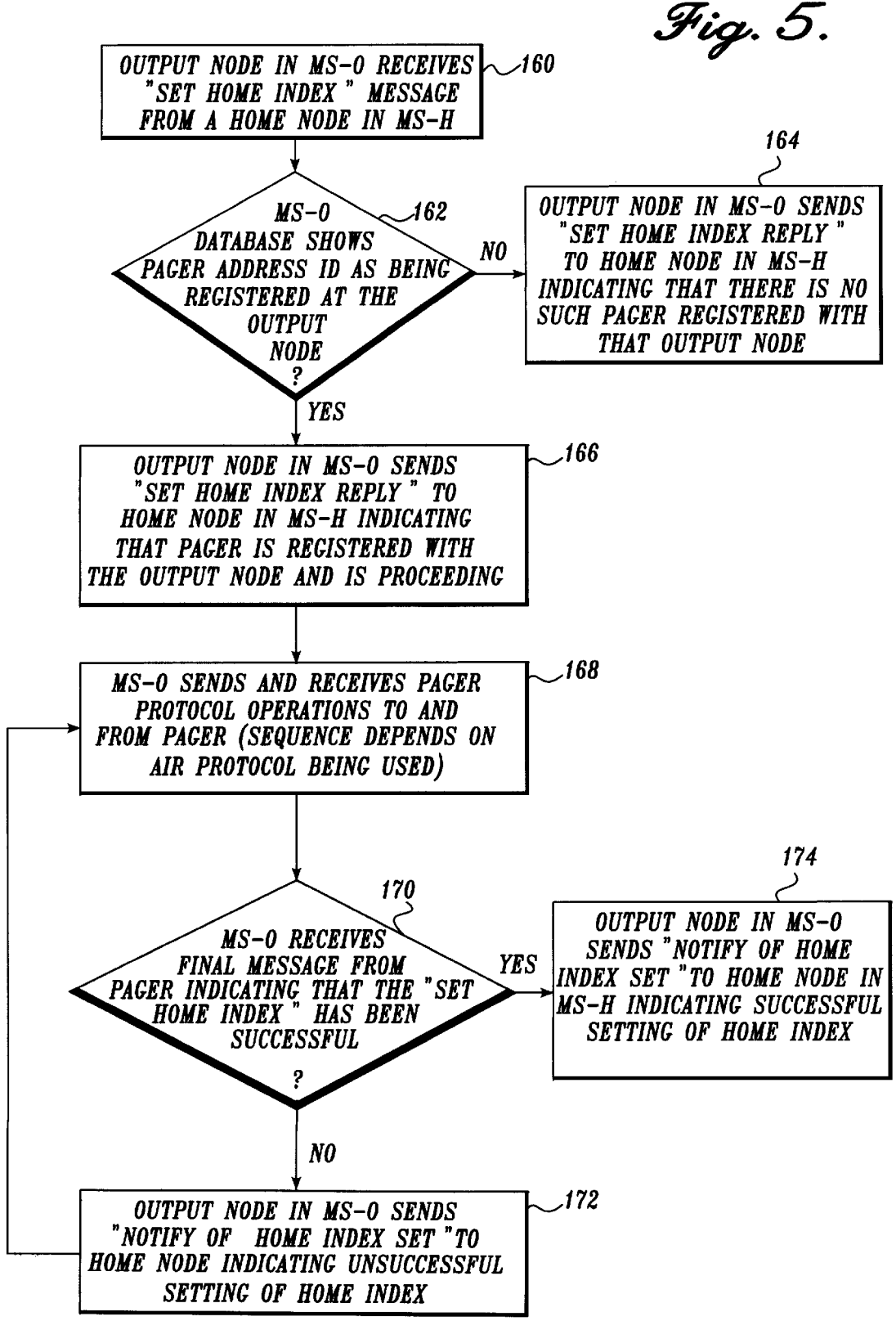
FIG. 5 is a flow chart of an output messaging switch's routine for responding to a Set Home identifier message from a home messaging switch.

FIG. 5 shows the Set Home Identifier routine of an output node. At a block 160 an output node in an output messaging switch receives a Set Home Identifier message from a home node in a home messaging switch. At decision block 162, the output messaging switch determines whether it has the pager registered in its registration database. If the pager is not registered at the output node, then the routine proceeds to a block 164 where the output messaging switch sends a Set Pager Home Identifier Reply message to the home messaging switch, indicating that the pager is not registered with that output node. The home node may then search for the pager by sending out a Find MS-O With Pager message as described below with reference to FIG. 6 at block 182. If the pager is registered at the output node, the routine proceeds to a block 166.

At block 166, the output messaging switch sends a Set Home Identifier Reply to the home messaging switch indicating that the Set Home Identifier message has been received at the correct output node and that the Set Home Identifier routine is now proceeding. At a block 168, the output messaging switch sends and receives pager protocol operations to and from the pager that perform the Set Home Identifier operation. After a brief interval, at a decision block 170 the output messaging switch determines whether it has received the correct final sequence message from the pager indicating that the Set Home Identifier routine has been successful. If the final sequence message has not been received, the routine proceeds to a block 172 where the output node in the output messaging switch sends a Notify of Home Identifier Set message to the home node indicating that the Set Home Identifier routine has not been successful. In some embodiments, the routine may then proceed back to block 168 to again try to set the home identifier. An unsuccessful setting may be due to bad transmission, a bad password, or congestion. If the output messaging switch has received the final sequence indicating that the Set Home Identifier routine has been successful, then the routine proceeds to a block 174. At block 174, the output messaging switch sends a Notify of Home Identifier Set to the home node indicating that the setting of the home identifier has been successful.

The reprogramming of the home identifier number can either be done by the home messaging switch that currently has the pager or by the new home messaging switch that is taking over the pager. It is recommended that only one of these two methods be used throughout one messaging switch network.

Figure 6:
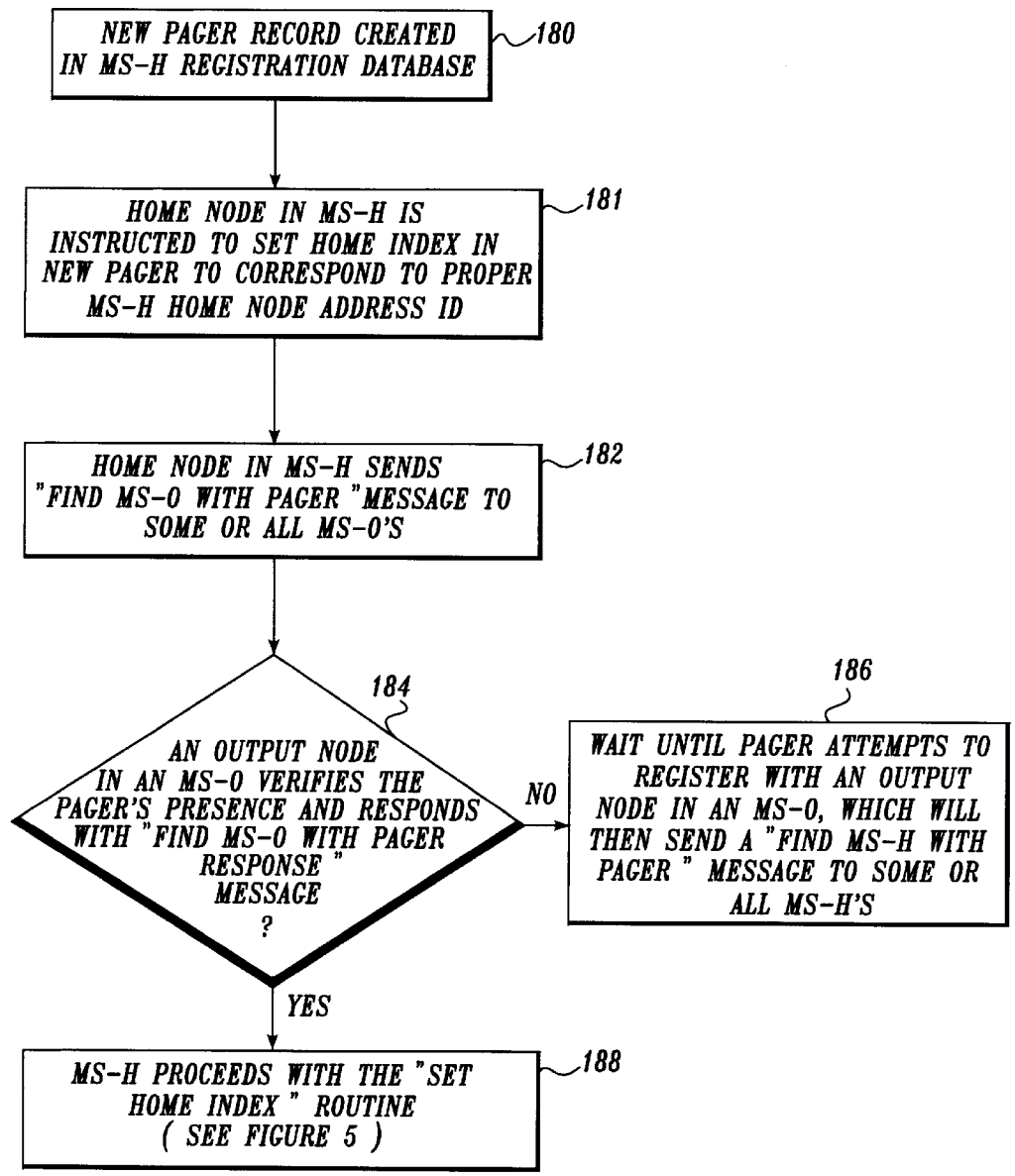
FIG. 6 is a flow chart of a home messaging switch's routine for searching for a pager when a new pager record is created by the service provider.

FIG. 6 shows a routine for a home messaging switch searching for a pager when a new pager record is created in the home messaging switch by the service provider. At a block 180, a new record is created for a pager in the home messaging switch's registration database for the new home node. Once this record is created, at a block 181 the home messaging switch is instructed to set the home identifier in the pager to a value that converts to the home node address ID for the home node that contains the record for the pager. The instruction to set the home identifier causes the home messaging switch to search for the pager.

At block 182, the home messaging switch searches for the pager by sending a Find MS-O With Pager message to some or all of the output nodes in the system. For example, if the home messaging switch knows that the pager is supposed to be at certain output nodes and not others, it may only send the Find MS-O with Pager message to those output nodes where the pager is supposed to be. At decision block 184, the home messaging switch determines whether it has received a Find MS-O With Pager Response message from an output node, which would indicate that that output node has the pager as registered in its area. If a Find MS-O With Pager Response message is received, the routine proceeds to a block 188 where the home messaging switch proceeds with the Set Home Identifier routine as described above with reference to FIG. 5. If no such message has been received, the routine proceeds to block 186, which indicates that nothing further will happen until the pager eventually attempts to register with an output node in an output messaging switch. When the pager attempts to register, the output messaging switch will send a Find MS-H With Pager message as described above with reference to FIG. 3A at block 110.

Figure 7:
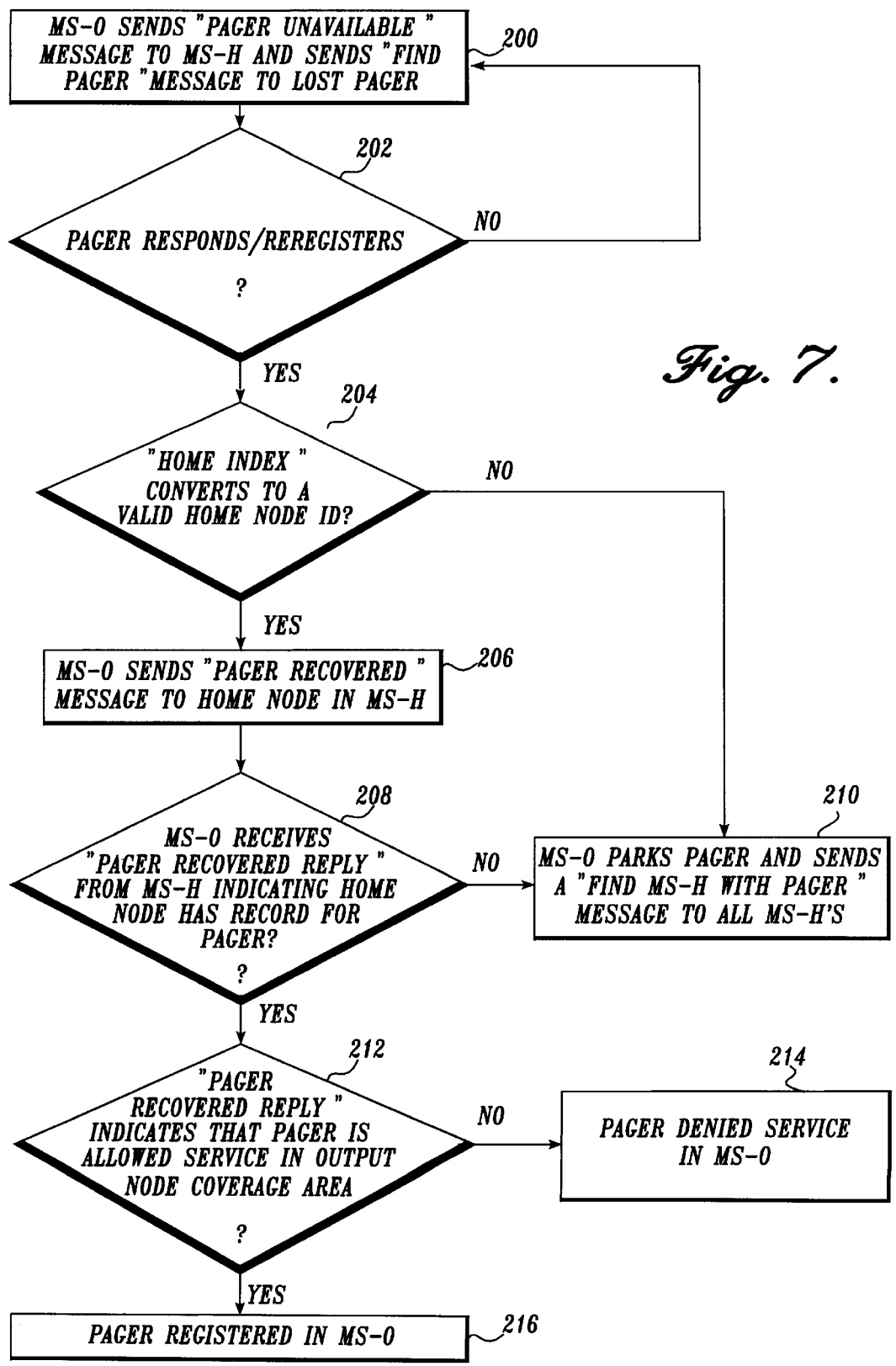
FIG. 7 is a flow chart of an output messaging switch's routine for recovering a lost pager.

FIG. 7 shows the Pager Recovered routine of an output messaging switch. The routine is somewhat similar to the routine of FIG. 3A. At a block 200, an output messaging switch sends a Pager Unavailable message to the home node and also sends a Find Pager message to a lost pager. This type of message will be sent when an output messaging switch has lost contact with a pager. For example, a pager is considered to be lost if it does not respond when it should to incoming messages. At a decision block 202, the output messaging switch determines whether the pager has re-registered or otherwise responded to the Find Pager message. If no response has been received after an appropriate delay, then the routine returns to block 200 where the output messaging switch sends another Find Pager message. If the pager does respond, the routine proceeds to a decision block 204. At block 204, the output messaging switch determines whether the whole or partial home identifier that was included with the pager response converts to a valid whole or partial home node address ID. If the home identifier does not convert to a valid home node address ID, then the routine proceeds to a block 210. If the home identifier does convert to one or several possible valid home node address IDs, then the routine continues to a block 206 where the output messaging switch sends a Pager Recovered message to the one or several home nodes.

At a decision block 208, the output messaging switch determines whether it has received a proper Pager Recovered Reply from the home messaging switch indicating that the home node has a record for the pager. If the output messaging switch does not receive this reply or if the reply indicates that the home node does not have a record for the pager, then the routine proceeds to block 210 where the output messaging switch parks the pager and sends a Find MS-H With Pager message to some or all of the home nodes. If the pager recovered reply indicates the home node does have a record for the pager, the routine continues to a decision block 212.

At decision block 212, the output messaging switch determines whether the Pager Recovered Reply indicates that the pager should be allowed service in the output node coverage area. If service is denied, the routine proceeds to block 214 where an acknowledgment is sent to the pager and the output messaging switch marks the pager in the output messaging switch's database as being denied service, which like parking prevents the pager from initiating any commands. If the pager is allowed service, the routine proceeds to a block 216 where an acknowledgment is sent to the pager, and the output messaging switch marks the pager in the output messaging switch's database as being allowed service.

Figure 8:
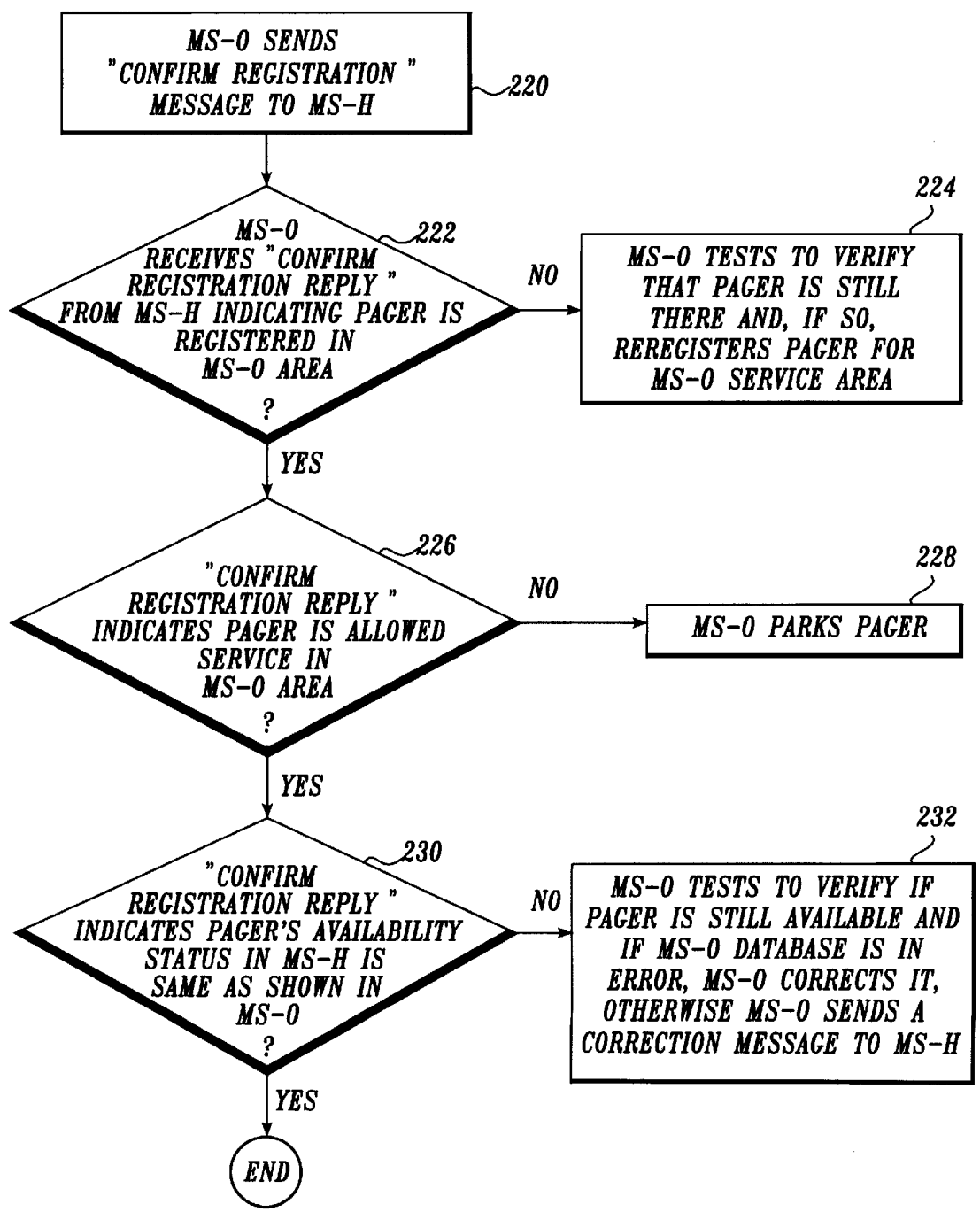
FIG. 8 is a flow chart of an output messaging switch's routine for synchronizing its database with that of a home messaging switch.

FIG. 8 shows a Confirm Registration routine of an output messaging switch. This routine is used by an output messaging switch to confirm that the data in its registration database is synchronized with the data in the home messaging switch's registration database. At a block 220, an output messaging switch sends a Confirm Registration message to a home node in a home messaging switch. At a decision block 222, the output messaging switch determines whether it has received a Confirm Registration Reply from the home messaging switch that indicates that the home messaging switch's registration database confirms that the pager is registered at the output node. If the Confirm Registration Reply confirms that the output node is the current registered location of the pager, then the routine proceeds to a decision block 226. If the Confirm Registration Reply does not confirm that the output node is the current registered location of the pager, then the routine proceeds to a block 224. At block 224, the output messaging switch does a test to confirm that the pager is still in the output node's coverage area. The test used may involve sending a Find Pager message, as illustrated at block 200 in FIG. 7, to elicit a response from the pager. If this test shows that the pager is still in the output node's area, the output messaging switch will re-register the pager starting with the routine shown at block 106 in FIG. 3A.

At a decision block 226, the output messaging switch determines whether the Confirm Registration Reply indicates that the pager should be allowed service in the output node's area. If service is denied, the routine proceeds to block 228 where the output messaging switch parks the pager if it is not already parked. If service is allowed, the routine proceeds to a decision block 230.

At decision block 230, the output messaging switch determines whether the Confirm Registration Reply shows the pager's availability status in the home messaging switch's registration database as being the same as the status shown in the output messaging switch's registration database. If the two switches' registration databases agree on the availability status of the pager, then the routine ends. If the two messaging switches' registration databases disagree on the pager's availability status, then the routine proceeds to a block 232. At block 232 the output messaging switch tests the availability status of the pager by sending a Find Pager message to the pager. If the pager is available, it will respond to the Find Pager message, and if it is not available, it will not respond. If this test shows that the output messaging switch's registration database has an incorrect availability status for the pager, then the output messaging switch will update its registration database. If the test shows that the home messaging switch's registration database has an incorrect availability status for the pager, then the output messaging switch will send a message to the home messaging switch that will update the pager's availability status in the home messaging switch's registration database.

Figure 9:
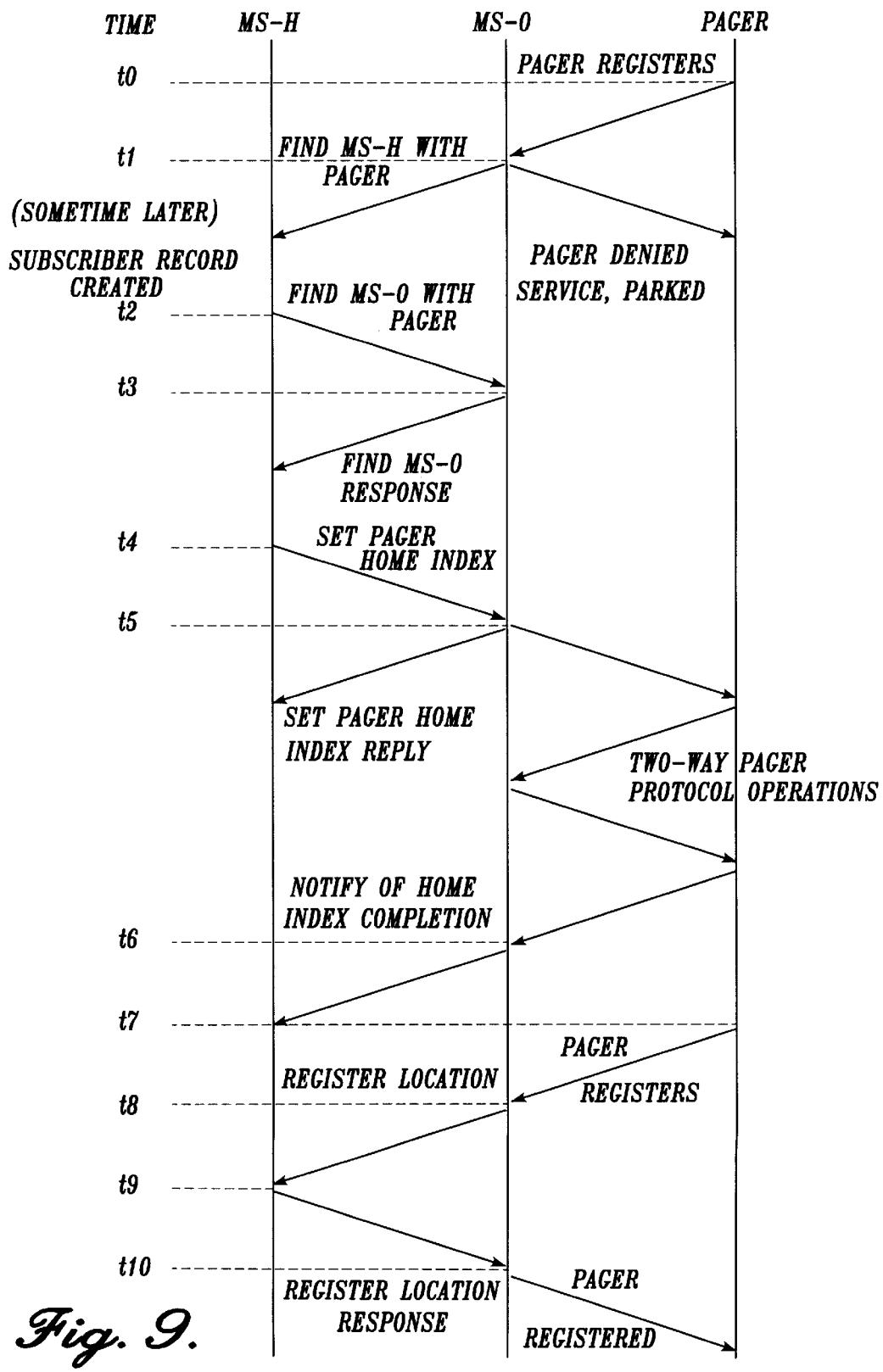
FIG. 9 is a timeline for an example sequence of a pager registering in a system without a home node specifically reserved for new pagers.

FIG. 9 shows a timeline example of a new pager registering in a system without a special home node reserved for new pagers. Reference will be made in this example to the messaging switches of FIG. 2. At a time t0, a Registration message is sent from a pager to an output messaging switch (designated output messaging switch 44 in this example). This would indicate that the pager is in the vicinity of base station 62 or 64 (FIG. 1), and thus the pager would be registering with output node N8. The pager information is then stored in the registration database of the output messaging switch 44 for node N8 at memory M8. This sequence corresponds to block 102 in FIG. 3A.

At time t1, the output messaging switch 44 determines that the home identifier given by the pager registration signal does not convert into a valid home node address ID number. The output messaging switch 44 then sends out a Find MS-H With Pager message to all of the home nodes in the system (in this case home nodes N4, N5, and N6), and also sends out a message to the pager indicating that it should be put into "stand-by" mode, and then marks the pager in the output messaging switch's database as being denied service. This sequence corresponds to block 110 in FIG. 3A.

At time t2, a new record for the pager has been created in a home messaging switch registration database (designated home messaging switch 23 for node N4 at memory M4 in this example). As described earlier, such a record is created by the service provider when a new pager is to be activated. Once this record is created, the home messaging switch 23 will be instructed to set the home identifier in the pager to a value that converts to the home node address ID for the home node that contains the record for the pager. The instruction to set the home index will cause the home messaging switch 23 to search for the pager by sending out a Find MS-O with Pager message to some or all of the output nodes in the system (in this case output nodes N7 and N8). This corresponds to block 182 in FIG. 6. An output messaging switch that receives the Find MS-O with Pager and believes it has the pager in one of its output node's area may be made to further confirm the pager's presence by sending a Find Pager message to the pager to verify that the pager responds. This step would prevent the erroneous situation where two output nodes both believed the pager was registered in their areas. At time t3 the output messaging switch 44 responds to the Find MS-O with Pager message from the home messaging switch 23 with a Find MS-O With Pager Response message, thus indicating that that output node N8 has the pager in its area. Home messaging switch 23 can identify the output node N8 in output messaging switch 44 that responded because the unique output node identification number is included as part of the response.

At time t4, the home messaging switch 23 sends a Set Home Identifier message to the output messaging switch 44. This corresponds to block 160 in FIG. 5. At time t5, the output messaging switch 44 determines that its registration database for node N8 at memory area M8 shows the pager as correctly being in its output area and so continues with the Set Home Identifier routine. This corresponds to decision block 162 in FIG. 5. A Set Pager Home Identifier Reply message is sent from the output messaging switch 44 to the home messaging switch 23 to let the home messaging switch know that the message was sent to the correct output switch and that the routine is proceeding. This corresponds to block 166 in FIG. 5. The output messaging switch 44 also sends and receives two-way pager protocol operations to and from the pager, which accomplish the setting of the home identifier in the pager. This corresponds to block 168 in FIG. 5. At time t6, the output messaging switch 44 has received the final sequence from the pager indicating that the Set Home Identifier operation has been successfully completed. A Notify of Home Identifier Set message is sent from the output messaging switch 44 to the home messaging switch 23 with an indication that the home identifier has been successfully set in the pager.

At time t7, the pager again attempts to register by sending a Registration message to the output messaging switch 44. At time t8 the home identifier converts into a valid home node ID for node N4, and thus output messaging switch 44 sends a Register Location message to home node N4 in the home messaging switch 23. This corresponds to block 106 in FIG. 3A.

At time t9, the home messaging switch 23 has determined that it does have the record for the pager and that the pager should be allowed service in the N8 output node area. The home messaging switch 23 thus sends a Register Location Reply to the output messaging switch 44 indicating that it does have the pager record for the pager address and that the pager should be allowed service. At time t10, the output messaging switch 44 sends a Pager Registered message to the pager, thus indicating that the registration process has been successfully completed. This corresponds to block 116 in FIG. 3A.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a paging system having a plurality of messaging switches through which messages are sent to pagers, the messaging switches comprising home and output messaging switches, a subset of the messaging switches having registration databases, the home messaging switches having pager records in their registration databases, the pager records being entered and modified by service providers, a method of registering and controlling registration data for a pager in the paging system, comprising the steps of:

(a) storing a home identifier in said pager;

(b) having said pager broadcast a registration message that includes the home identifier;

(c) receiving at an output messaging switch the registration message and using the home identifier to determine the home messaging switch or possible set of home messaging switches that has the record for the pager;

(d) sending a register location message from the output messaging switch to the home messaging switch or possible set of home messaging switches to register the current location of the pager, (e) having the home messaging switch respond to the register location message by sending a register location reply to the output messaging switch, which indicates whether or not the home messaging switch has a record for the pager and whether or not the pager is designated to receive service in the output messaging switch's area; and (f) having the output messaging switch respond to a register location reply message that indicated the home messaging switch did not have a record for the pager by sending a find home messaging switch with pager message to a group of home messaging switches to search for a home messaging switch that has a record for the pager.

2. In a paging system having a plurality of messaging switches through which messages are sent to pagers, the messaging switches comprising home and output messaging switches, a subset of the messaging switches having registration databases, the home messaging switches having pager records in their registration databases, the pager records being entered and modified by service providers, a method of registering and controlling registration data for a pager in the paging system, comprising the steps of:

(a) storing a home identifier in said pager;

(b) having said pager broadcast a registration message that includes the home identifier;

(c) receiving at an output messaging switch the registration message and using the home identifier to determine the home messaging switch or possible set of home messaging switches that has the record for the pager;

(d) sending a register location message from the output messaging switch to the home messaging switch or possible set of home messaging switches to register the current location of the pager, and (e) having the output messaging switch determine if the home identifier corresponded to a valid home messaging switch and, if not, sending a find home messaging switch with pager message to a group of home messaging switches to search for a home messaging switch that has a record for the pager.

3. In a paging system having a plurality of messaging switches through which messages are sent to pagers, the messaging switches comprising home and output messaging switches, a subset of the messaging switches having registration databases, the home messaging switches having pager records in their registration databases, the pager records being entered and modified by service providers, a method of registering and controlling registration data for a pager in the paging system, comprising the steps of:

(a) storing a home identifier in said pager;

(b) having said pager broadcast a registration message that includes the home identifier;

(c) receiving at an output messaging switch the registration message and using the home identifier to determine the home messaging switch or possible set of home messaging switches that has the record for the pager;

(d) sending a register location message from the output messaging switch to the home messaging switch or possible set of home messaging switches to register the current location of the pager, (e) having the output messaging switch synchronize its registration database with the home messaging switch's registration database by sending a confirm registration message to the home messaging switch, the home messaging switch in response sending a confirm registration reply that states whether its registration database indicates that the pager is registered in the output messaging switch's area and, if so, whether the pager is believed to be available and whether the pager is supposed to be receiving service in the output messaging switch's area; and (f) having the output messaging switch respond to a confirm registration reply that states the pager is not registered at the output messaging switch's area by performing a test to verify that the pager is still in the output messaging switch's area and, if it is, re-registering the pager's output messaging switch location with the home messaging switch and, if it is not, correcting its own registration database.

4. In a paging system having a plurality of messaging switches through which messages are sent to pagers, the messaging switches comprising home and output messaging switches, a subset of the messaging switches having registration databases, the home messaging switches having pager records in their registration databases, the pager records being entered and modified by service providers, a method of registering and controlling registration data for a pager in the paging system, comprising the steps of:

(a) storing a home identifier in said pager;

(b) having said pager broadcast a registration message that includes the home identifier;

(c) receiving at an output messaging switch the registration message and using the home identifier to determine the home messaging switch or possible set of home messaging switches that has the record for the pager;

(d) sending a register location message from the output messaging switch to the home messaging switch or possible set of home messaging switches to register the current location of the pager, (e) having the output messaging switch synchronize its registration database with the home messaging switch's registration database by sending a confirm registration message to the home messaging switch, the home messaging switch in response sending a confirm registration reply that states whether its registration database indicates that the pager is registered in the output messaging switch's area and, if so, whether the pager is believed to be available and whether the pager is supposed to be receiving service in the output messaging switch's area; and (f) having the output messaging switch respond to a confirm registration reply that indicates that the availability status of the pager is different from the availability status indicated by the output messaging switch's registration database by performing a test to verify the availability status of the pager and, if the test indicates that the output messaging switch's database is in error, correcting it; and if the test indicates that the home messaging switch's registration database is in error, correcting it by sending a message indicating the true pager availability status to the home messaging switch.

5. In a paging system having a plurality of nodes and messaging switches, said nodes comprising home and output nodes, said messaging switches comprising home and output messaging switches, said nodes being located in said messaging switches, a subset of said output nodes representing base stations that can send and receive messages to and from pagers, a subset of said messaging switches having registration databases, said home messaging switches that have registration databases having pager records in their registration databases, a method of registering and controlling registration data for a pager in the paging system, said method comprising the steps of:

(a) programming a home identifier in said pager that can be converted into a home node address;

(b) sending a registration message from the pager that includes all or part of the home identifier to a base station;

(c) relaying from the base station the registration message to the output messaging switch that controls the base station;

(d) recording the pager in the registration database of the output messaging switch for the output node that represents the base station;

(e) verifying at the output messaging switch that the home node address or addresses that were converted in whole or in part from the home identifier are valid home node addresses and, if they are, sending a register location message to at least one of the home node addresses;

(f) receiving the register location message at the home messaging switch that includes the home node;

(g) verifying at the home messaging switch that a record for the pager exists in the home node's registration database and, if it does, recording the present output node location of the pager; and (h) having the output messaging switch respond to the home node address being invalid by sending a find home node with pager message to a set of home nodes in an attempt to find the home node for the pager.

6. The method of claim 5, further comprising the step of having a home messaging switch that has the home node for the pager respond to the find home messaging switch with pager message by sending a set home identifier message that instructs the output messaging switch to reprogram the home identifier in the pager to correspond to the home node address.

7. In a paging system having a plurality of nodes and messaging switches, said nodes comprising home and output nodes, said messaging switches comprising home and output messaging switches, said nodes being located in said messaging switches, a subset of said output nodes representing base stations that can send and receive messages to and from pagers, a subset of said messaging switches having registration databases, said home messaging switches that have registration databases having pager records in their registration databases, a method of registering and controlling registration data for a pager in the paging system, said method comprising the steps of:

(a) programming a home identifier in said pager that can be converted into a home node address;

(b) sending a registration message from the pager that includes all or part of the home identifier to a base station;

(c) relaying from the base station the registration message to the output messaging switch that controls the base station;

(d) recording the pager in the registration database of the output messaging switch for the output node that represents the base station;

(e) verifying at the output messaging switch that the home node address or addresses that were converted in whole or in part from the home identifier are valid home node addresses and, if they are, sending a register location message to at least one of the home node addresses;

(f) receiving the register location message at the home messaging switch that includes the home node;

(g) verifying at the home messaging switch that a record for the pager exists in the home node's registration database and, if it does, recording the present output node location of the pager; and (h) having the home messaging switch send a register location reply to the output messaging switch that indicates if the registration database for the home node has a record for the pager and whether the pager should receive service in the output node area.

8. The method of claim 7, further comprising the step of having the output messaging switch respond to a register location reply that indicates that the registration database for the home node does not have a record for the pager by sending a find home node with pager message to a set of home nodes in an attempt to find the home node for the pager.

9. The method of claim 8, further comprising the step of having a home messaging switch that has the home node for the pager respond to the find home node with pager message by sending a set home identifier message that instructs the output messaging switch to reprogram the home identifier in the pager to convert to the home node address.

10. In a paging system having a plurality of nodes and messaging switches, said nodes comprising home and output nodes, said messaging switches comprising home and output messaging switches, said nodes being located in said messaging switches, a subset of said output nodes representing base stations that can send and receive messages to and from pagers, a subset of said messaging switches having registration databases, said home messaging switches that have registration databases having pager records in their registration databases, a method of registering and controlling registration data for a pager in the paging system, said method comprising the steps of:

(a) programming a home identifier in said pager that can be converted into a home node address;

(b) sending a registration message from the pager that includes all or part of the home identifier to a base station;

(c) relaying from the base station the registration message to the output messaging switch that controls the base station;

(d) recording the pager in the registration database of the output messaging switch for the output node that represents the base station;

(e) verifying at the output messaging switch that the home node address or addresses that were converted in whole or in part from the home identifier are valid home node addresses and, if they are, sending a register location message to at least one of the home node addresses;

(f) receiving the register location message at the home messaging switch that includes the home node;

(g) verifying at the home messaging switch that a record for the pager exists in the home node's registration database and, if it does, recording the present output node location of the pager;

(h) having the output messaging switch synchronize its registration database for an output node with a home messaging switch's registration database for a home node, by sending a confirm registration message to the home messaging switch, which in response sends a confirm registration reply that states whether its registration database indicates that the pager is registered in the output node's area and, if so, whether the pager is believed to be available and whether the pager should receive service in the output node's area; and (i) having the output messaging switch respond to a confirm registration reply that states the pager is not registered at the output node's area by performing a test to verify that the pager is still in the output node's area and, if it is, re-registering the pager's output node location with the home node and, if it is not, correcting the registration database for the output node.

11. In a paging system having a plurality of nodes and messaging switches, said nodes comprising home and output nodes, said messaging switches comprising home and output messaging switches, said nodes being located in said messaging switches, a subset of said output nodes representing base stations that can send and receive messages to and from pagers, a subset of said messaging switches having registration databases, said home messaging switches having registration databases having pager records in their registration databases, a method of registering and controlling registration data for a pager in the paging system, said method comprising the steps of:

(a) programming a home identifier in said pager that can be converted into a home node address;

(b) sending a registration message from the pager that includes all or part of the home identifier to a base station;

(c) relaying from the base station the registration message to the output messaging switch that controls the base station;

(d) recording the pager in the registration database of the output messaging switch for the output node that represents the base station;

(e) verifying at the output messaging switch that the home node address or addresses that were converted in whole or in part from the home identifier are valid home node addresses and, if they are, sending a register location message to at least one of the home node addresses;

(f) receiving the register location message at the home messaging switch that includes the home node;

(g) verifying at the home messaging switch that a record for the pager exists in the home node's registration database and, if it does, recording the present output node location of the pager;

(h) having the output messaging switch synchronize its registration database for an output node with a home messaging switch's registration database for a home node, by sending a confirm registration message to the home messaging switch, which in response sends a confirm registration reply that states whether its registration database indicates that the pager is registered in the output node's area and, if so, whether the pager is believed to be available and whether the pager should receive service in the output node's area; and (i) having the output messaging switch respond to a confirm registration reply that indicates that the availability status of the pager is different from the availability status indicated by the output messaging switch's registration database for the output node, by performing a test to verify the availability status of the pager, and if the test indicates that the output messaging switch's database for the output node is in error, correcting it, and if the test indicates that the home messaging switch's registration database for the home node is in error, correcting it by sending a message to the home messaging switch's registration database for the home node that indicates the pager's availability status.

12. In a paging system having a plurality of messaging switches through which messages are sent to pagers, the messaging switches comprising home and output messaging switches, some of the messaging switches having registration databases, the home messaging switches having pager records in their registration databases, a method of controlling registration data for new and roaming pagers in the paging system, comprising the steps of:

(a) a messaging switch of a first type sending a find messaging switch of a second type with pager message to a group of messaging switches of a second type; and (b) a messaging switch of the second type that has a record of the pager in its registration database responding to the find messaging switch of a second type with pager message;

wherein the first type of messaging switch is a home messaging switch and the second type of messaging switch is an output messaging switch and the response of the output messaging switch to the find output messaging switch with pager message is a find output messaging switch with pager response message that is sent to the home messaging switch and reveals the present output messaging switch location of the pager.

13. In a paging system having a plurality of messaging switches through which messages are sent to pagers, the messaging switches comprising home and output messaging switches, some of the messaging switches having registration databases, the home messaging switches having pager records in their registration databases, a method of controlling registration data for new and roaming pagers in the paging system, comprising the steps of:

(a) a messaging switch of a first type sending a find messaging switch of a second type with pager message to a group of messaging switches of a second type;

(b) a messaging switch of the second type that has a record of the pager in its registration database responding to the find messaging switch of a second type with pager message;

(c) having an output messaging switch synchronize its registration database with a home messaging switch's registration database by sending a confirm registration message to the home messaging switch, the home messaging switch in response sending a confirm registration reply that includes information regarding the pager that is stored in the home messaging switch's registration database; and (d) having the output messaging switch determine whether the information from the home messaging switch's registration database is the same as the information in the output messaging switch's registration database and, if it is not, then confirming the information with the pager and correcting whichever registration database is in error.

14. In a paging system having a plurality of components through which messages are sent to pagers, some of the components having circuitry for transmitting signals to the pagers and some of the components having circuitry for receiving signals from the pagers, a method for determining a home component to send information to when a signal is received from a pager, the method comprising the steps of:

(a) storing a home identifier in the pager;

(b) having the pager transmit the home identifier to a component that receives signals from the pager;

(c) converting the home identifier into an address for the home component and sending information to the home component when signals are received from the pager; and wherein the home component whose address is converted from the home identifier receives information as to the location of the pager when the home component is contacted; and wherein the home component whose address is converted from the home identifier stores the information as to the location of the pager and uses the information to route future messages to the pager.

15. The method of claim 14, wherein the home component is able to reprogram the home identifier that is stored in the pager by sending a set home identifier message to the component that receives signals from the pager, which instructs the component to reprogram the home identifier.

16. The method of claim 14, wherein a home component is specifically reserved for new pagers, and further comprising the step of programming a new pager's home identifier to correspond to the home component that is specifically reserved for new pagers.

17. The method of claim 16, further comprising the step of having the home component that is specifically reserved for new pagers respond to a pager registering by sending a set home identifier message to the component that receives signals from the pager, which instructs the component to reprogram the home identifier so that it corresponds to another home component that will then service the pager.

18. In a paging system having a plurality of components through which messages are sent to pagers, some of the components having circuitry for transmitting signals to the pagers and some of the components having circuitry for receiving signals from the pagers, a method for determining a home component to send information to when a signal is received from a pager, the method comprising the steps of:

(a) storing a home identifier in the pager;

(b) having the pager transmit the whole home identifier or a part thereof to a component that receives signals from the pager;

(c) converting the whole or partial home identifier into one or several addresses for home components and searching the home components to determine the correct home component for the pager; and (d) sending information regarding the pager to the correct home component for the pager when signals are received from the pager;

wherein the correct home component is sent information as to the location of the pager once the home identifier is transmitted from the pager; and wherein the home component stores the information as to the location of the pager and uses the information to route future messages to the pager.

19. The method of claim 18, wherein the home component is able to reprogram the home identifier that is stored in the pager by sending a set home identifier message to the component that receives signals from the pager, which instructs the component to reprogram the home identifier.

20. The method of claim 18, wherein a home component is specifically reserved for new pagers, and further comprising the step of programming a new pager's home identifier to correspond to the home component that is specifically reserved for new pagers.

21. The method of claim 20, further comprising the step of having the home component that is specifically reserved for new pagers respond to a pager registering by sending a set home identifier message to the component that receives signals from the pager, which instructs the component to reprogram the home identifier so that it corresponds to another home component that will then service the pager.

* * * * *

UNITED STATES PATENT AND TRADEMARK OFFICE
CERTIFICATE OF CORRECTION

PATENT NO. : 6,173,157 B1  
DATED : January 9, 2001  
INVENTOR(S) : A. Godoroja et al.

Page 1 of 1

It is certified that error appears in the above-identified patent and that said Letters Patent is hereby corrected as shown below:

Title page, Item [56],
References Cited, Other Publications, insert in appropriate order the following:
-- OTHER PUBLICATIONS
1989 documentation and description of prior art AUTOTEL system sold by Glenayre Electronics. --

Item [57], Abstract,
Line 6, "and area," should read -- an area, --
Line 12, "in home" should read -- in a home --
Lines 16-17, delete the second occurrence of "The home indentifier in a pager can be reprogrammed through an over-the-air procedure."
Line 18, "an output messaging switches" should read -- and output messaging switches --

Signed and Sealed this

Thirteenth Day of November, 2001

Attest:

NICHOLAS P. GODICI  
Attesting Officer     Acting Director of the United States Patent and Trademark Office